Jan. 13, 1931.  M. COLOMBO  1,788,482
CHAMBER FOR THE MANUFACTURE OF SULPHURIC ACID
Filed May 6, 1927
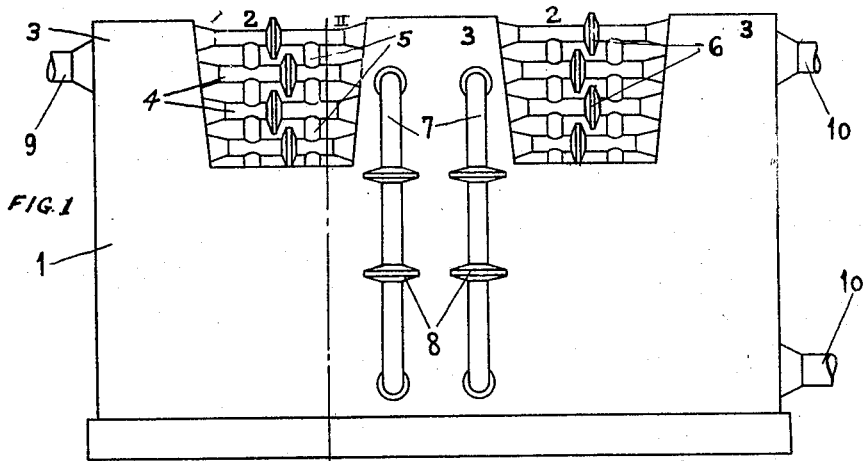
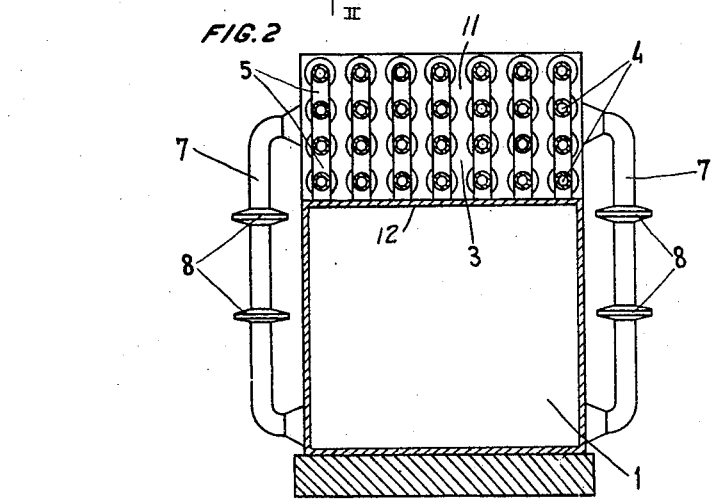
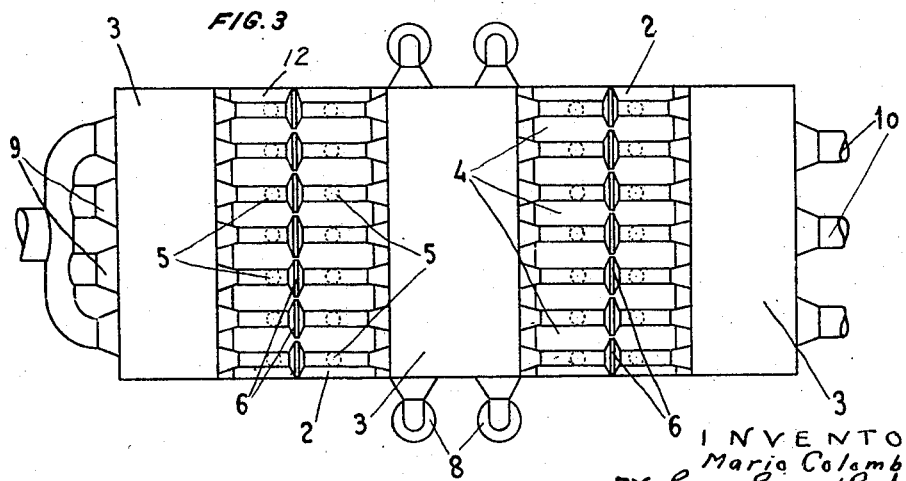
INVENTOR:
Mario Colombo
BY: Ruege, Boyce & Bakilar
ATTORNEYS.

Patented Jan. 13, 1931

1,788,482

UNITED STATES PATENT OFFICE

MARIO COLOMBO, OF BARCELONA, SPAIN

CHAMBER FOR THE MANUFACTURE OF SULPHURIC ACID

Application filed May 6, 1927, Serial No. 189,205, and in Spain May 6, 1926.

It is well known that the production of sulphuric acid is due to a high exothermic reaction and that the amount produced by the apparatus adapted for the manufacture thereof depends to a great extent on the number of calories which can be eliminated per unit of volume.

The old lead chambers of parallelopiped shape produce from 5 to 7 kilos of sulphuric acid of 53 Bé. per cubic metre of capacity and are provided with a cooling surface of from 0.5 to 0.7 square metres per cubic metre of capacity.

When it is desired to obtain a more efficient operation, that is to say, when it is desired to produce a larger quantity of acid per cubic metre, without the lead being attacked or the waste of nitric acid being appreciably increased, it is necessary to find a more efficient method and also to eliminate the calories developed by the reactions.

In order to obtain this result the three following conditions are necessary:

Increase of the cooling surface per cubic metre of capacity according to the ratio $$\frac{S}{V}.$$

External or internal artificial cooling of the walls.

Artificial cooling of the atmosphere of the chamber.

The first condition is satisfied by very long and very high vertical chambers or somewhat lower and wider chambers, the latter chambers, however, being always higher than the chambers which were constructed everywhere immediately after the end of the European war.

It will, however, be shown that little is gained by these chambers. In fact the first mentioned chambers are based on an idea which is erroneous in many respects and do not meet the requirements expected of them so that at the present time plants are completely abandoned which do not satisfy ratio $$\frac{S}{V}$$

equal to 0.85.

The ratio of the second mentioned chambers is only equal to from 0.5 to 0.6 and many of these chambers, as is also the case with the first mentioned chambers produce only from 8 to 10 kilos of sulphuric acid of 53 Bé. per cubic metre capacity when working at their full efficiency.

Better results are obtained when the walls and tops of the chambers are artificially cooled externally by means of water, when the production has been increased to as much as 17 kilos per cubic metre capacity when the chambers are working efficiently. The internal cooling of the walls by means of sulphuric acid is another solution, but has disadvantages by reason of complications in carrying out and involves considerable waste of acid for cooling purposes.

Both of these methods require vertical chambers of relatively small horizontal section and of great height with which are associated the same defects (but to a lesser degree) referred to in the preceding paragraph in connection with very wide and high chambers, or there is insufficient sulphuric acid available so that the operation cannot be proceeded with when an interruption ocurs in other plants, thus frequently delaying operation for several days. This drawback cannot be overcome by the provision of receptacles for containing the sulphuric acid as otherwise there would be no economy in lead which is one of the advantages of this type of chamber, when chambers of larger capacity are provided the ratio $$\frac{S}{V}$$

is reduced. For constructional reasons it is not possible to provide the same plant with chambers of different heights and widths (or diameters) as this would give the whole plant a very unsatisfactory appearance. It would also cause defective operation of the pulverizers (for water and acid) and by the great height of the chamber the pulverized mist before reaching the interior would be converted into drops of large dimensions so that the efficiency would be considerably reduced, probably even to zero. The space available at the top of the chambers for the reception of the pulverizers for the acid, which are necessary when it is desired to increase the production of these chambers by means of such devices, would be insufficient for the purpose. It is also impossible to convert the chambers of the existing type into chambers of the new type, as there is too great a difference in construction between the two types.

The artificial cooling of the atmosphere of the chambers by means of internal pulverization of the acid has the advantage of being applicable, at least in theory, to all existing types of chambers so as to increase the output thereof.

This system however, although excellent, has its disadvantages such as the difficulty of finding pulverizers which effect efficient pulverization, the loss of power for elevating the acid adapted to be pulverized, complications of a chemical, physical and mechanical nature inherent in the pulverization of the acid, and finally the extremely delicate operation required and which renders it necessary for the plant to be constantly attended to by skilled and competent workmen.

All the above mentioned disadvantages experienced hitherto are entirely avoided by the present invention which will be described hereinafter with reference to the accompanying drawings in which there is illustrated, solely by way of example, one form of construction in accordance with the invention.

Fig. 1 is a side elevation of the apparatus;
Fig. 2 is a vertical transverse section taken approximately on the line II—II of Fig. 1; and
Fig. 3 is a plan view thereof.

The apparatus consists of a chamber 1 of lead which is of a parallelopiped or truncated pyramid shape with a rectangular or polygonal base. At the upper portion this chamber is provided with one or more sections 3 of trapezoidal shape and of the same width as the chamber 1, said sections being formed by cutting away and removing similarly shaped portions of the side walls of the chamber together with the portion of the top wall connecting said side portions, as indicated at 2, Fig. 1. The width, depth and number of said sections may vary with each individual construction.

The sections 3 of the chamber are of course provided with end walls 11, Fig. 2, which merge at their lower edges into a horizontal wall 12, the end walls of adjacent sections being connected together by means of pipes 4, of lead, lead and antimony or other suitable material, which are either horizontal or inclined and the length of which depends on the length of the cut out portions 2. Any suitable number of pipes 4 may be provided and they may be of any suitable diameter, the number and diameter being determined for each individual case.

The pipes 4 are connected together vertically by pipes 5 of lead, lead and antimony or other suitable material, which at the bottom communicate with the top of the chamber 1. The number and the diameter of these pipes 5 are also variable and depend on the particular case under consideration.

Both the pipes 4 and the popes 5 as well as pipes 7 hereinafter referred to, may be provided with smooth or corrugated walls or may be provided with cooling fins. The pipes 4 are provided with enlargements 6 of lead, lead and antimony or other suitable material, and may vary in number.

The pipes 7 which are also provided with similar enlargements 8 are adapted to receive the hot gases from the upper part or parts 3 of the apparatus, to cool them and to conduct them whilst they are being cooled to the lower part of the chamber 1. These pipes 7 may be cooled externally by water. In this manner there is formed an active circulation of gases between 3 and 1, and calories are removed from the chamber.

All the pipes, both the inlet pipes 9 and the outlet pipes 10, for the gases are provided with contraction and expansion cones which reduce the resistance of the said pipes anywhere from fifty to a hundred per cent, thus considerably facilitating the passage of the gases. The pipes 9 and 10 are also provided with enlargements.

By suitably combining and dimensioning these elements it is possible to obtain a higher value (1.5 at least) for the ratio $$\frac{S}{V}.$$

This is considerably higher than that obtained hitherto in other types of chambers and it permits of obtaining the output required of the chamber, that is to say, keeping constant the transverse section, the width and height of each chamber by the provision of an apparatus which is compact and easy to construct whereby it is possible to obtain in each chamber or section of the chamber the required value of the ratio $$\frac{S}{V}.$$

The chambers constructed according to the present invention whilst being of variable superficial area are of constant width height and external breadth, which has not been the case with other types of chambers constructed hitherto.

As all the pipes and the walls of the parts 3 and of the chamber 1 may be cooled externally by water it will be understood that with the chamber, according to the invention it is possible to obtain a more intense action than has been obtained hitherto.

The gases which are supplied by the pipes 9 to the pipes 4 and 5 produce an intense reaction in these pipes which is of great value in respect of the ratio $$\frac{S}{V}.$$

In the pipes 4 and 5 there occurs a very energetic condensation whilst at the same time the friction against the walls of the pipes and the divergent and numerous changes of direction of the gases serves to deprive them of all the liquid which they contain in suspension.

The acid thus produced and separated passes through the pipes 4 and 5 and through the enlargements 6 into the chamber 1 in the form of a very fine and cold mist which further assists the intensive action in the chamber without interfering with or affecting the losses in pulverization which are usually caused deliberately.

As this pulverization is constant, the output depends on the construction of the chamber, whilst its constant operation is ensured without the necessity of constant attention by skilled and experienced workmen.

It will be understood that the shape, dimensions and details of construction of the chamber may be varied without changing, modifying or altering the scope of the invention.

I claim:

1. An apparatus of the character described, comprising a chamber having in its upper portion a plurality of sections of trapezoidal shape, said sections corresponding in width to the width of the chamber but of predetermined breadth and depth, and pipes connecting the portions of the chamber between said sections.

2. An apparatus of the character described, comprising a chamber having in its upper portion a plurality of sections of trapezoidal shape, said sections corresponding in width to the width of the chamber but of predetermined breadth and depth, pipes connecting the portions of the chamber between said sections, and pipes interconnecting said first pipes and communicating with the chamber below said sections.

3. An apparatus of the character described, comprising a chamber having in its upper portion a plurality of sections of trapezoidal shape, said sections corresponding in width to the width of the chamber but of predetermined breadth and depth, pipes connecting the portions of the chamber between said sections, and exterior pipes connecting the portions of the chamber between said sections with the portion of the chamber below the sections.

4. An apparatus of the character described, comprising a chamber having in its upper portion a plurality of sections of trapezoidal shape, said sections corresponding in width to the width of the chamber but of predetermined breadth and depth, and pipes connecting the portions of the chamber between said sections, said pipes being provided with means for facilitating the cooling thereof.

5. An apparatus of the character described, comprising a chamber having in its upper section a plurality of sections of trapezoidal shape, said sections corresponding in width to the width of the chamber but of predetermined breadth and depth, pipes connecting the portions of the chamber between said sections, and charging and delivery pipes communicating with said chamber, all of said pipes being provided with cone-shaped portions thereby to reduce the resistance thereof.

6. An apparatus of the character described, comprising a chamber having in its upper portion a plurality of sections of trapezoidal shape, said sections corresponding in width to the width of the chamber but of predetermined breadth and depth, pipes connecting the portions of the chamber between said sections, pipes interconnecting said first pipes and communicating with the chamber below said sections, exterior pipes connecting the portions of the chamber between said sections with the portion of the chamber below said sections, and charging and delivery pipes communicating with said chamber, all of said pipes being provided with cone-shaped portions thereby to reduce the resistance thereof.

In testimony whereof I have signed my name to this specification.

MARIO COLOMBO.